(12) United States Patent
Ren et al.

(10) Patent No.: US 11,134,129 B2
(45) Date of Patent: Sep. 28, 2021

(54) SYSTEM FOR DETERMINING WHETHER TO FORWARD PACKET BASED ON BIT STRING WITHIN THE PACKET

(71) Applicant: HUAWEI TECHNOLOGIES CO., LTD., Guangdong (CN)

(72) Inventors: Shoushou Ren, Beijing (CN); Delei Yu, Beijing (CN); Shen Yan, Beijing (CN); Chuang Wang, Beijing (CN); Zongxin Dou, Beijing (CN); Wanhong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/911,152

(22) Filed: Jun. 24, 2020

(65) Prior Publication Data

US 2020/0329111 A1 Oct. 15, 2020

Related U.S. Application Data

(63) Continuation of application No. PCT/CN2018/121249, filed on Dec. 14, 2018.

(30) Foreign Application Priority Data

Dec. 27, 2017 (CN) .......................... 201711451081.7

(51) Int. Cl.
*H04L 12/761* (2013.01)
*H04L 29/08* (2006.01)
*H04L 12/753* (2013.01)

(52) U.S. Cl.
CPC .............. *H04L 67/22* (2013.01); *H04L 45/16* (2013.01); *H04L 45/48* (2013.01); *H04L 67/12* (2013.01); *H04L 69/324* (2013.01)

(58) Field of Classification Search
CPC ......... H04L 45/16; H04L 45/48; H04L 45/00; H04L 45/7457; H04L 45/745;
(Continued)

(56) References Cited

U.S. PATENT DOCUMENTS

2012/0082163 A1* 4/2012 Esteve Rothenberg ..................... H04L 45/00 370/392
2012/0257506 A1* 10/2012 Bazlamacci ........ H04L 45/7457 370/235
(Continued)

FOREIGN PATENT DOCUMENTS

CN 102148746 A 8/2011
CN 102970150 A 3/2013
(Continued)

OTHER PUBLICATIONS

Extended European Search Report issued in European Application No. 18893637.1 dated Nov. 13, 2020, 9 pages.
(Continued)

*Primary Examiner* — Le H Luu
(74) *Attorney, Agent, or Firm* — Fish & Richardson P.C.

(57) ABSTRACT

Embodiments of the present invention provide a packet processing method, including: receiving, by a first node, a first packet, where the first packet carries a first bit string, the first bit string includes M bit sets, each bit set corresponds to one node group, a value of the bit set is used to indicate whether one or more target nodes of the first packet include the corresponding node group; and determining, by the first node based on the first bit string and a second bit string, whether to send the first packet to a second node, where the second bit string includes N bit sets, each bit set corresponds to one node group, a value of the bit set is used to indicate
(Continued)

whether a node belonging to the corresponding node group exists in one or more related nodes of the first node.

20 Claims, 5 Drawing Sheets

(58) Field of Classification Search
CPC ....... H04L 67/12; H04L 67/22; H04L 69/324; H04L 12/1877; H04L 12/189; H04L 12/4633; H04N 21/6125; H04W 74/0833
See application file for complete search history.

(56) References Cited

U.S. PATENT DOCUMENTS

| | | | | |
|---|---|---|---|---|
| 2014/0160926 | A1* | 6/2014 | Gage | H04W 74/0833 |
| | | | | 370/235 |
| 2015/0131658 | A1 | 5/2015 | Wijnands et al. | |
| 2015/0181309 | A1* | 6/2015 | Shepherd | H04N 21/6125 |
| | | | | 725/109 |
| 2016/0119159 | A1* | 4/2016 | Zhao | H04L 12/189 |
| | | | | 370/390 |
| 2016/0254988 | A1* | 9/2016 | Eckert | H04L 12/4633 |
| | | | | 370/390 |
| 2017/0324575 | A1* | 11/2017 | Wijnands | H04L 45/745 |
| 2018/0287935 | A1* | 10/2018 | Wang | H04L 12/4633 |
| 2019/0123922 | A1* | 4/2019 | Suthar | H04L 12/1877 |

FOREIGN PATENT DOCUMENTS

| | | |
|---|---|---|
| CN | 106209629 A | 12/2016 |
| CN | 106603413 A | 4/2017 |
| CN | 106817308 A | 6/2017 |
| CN | 107171977 A | 9/2017 |
| CN | 108337176 A | 7/2018 |
| KR | 20110071651 A | 6/2011 |

OTHER PUBLICATIONS

Office Action issued in Chinese Application No. 201711451081.7 dated May 20, 2020, 10 pages (with English translation).
PCT International Search Report and Written Opinion issued in International Application No. PCT/CN2018/121249 dated Feb. 27, 2019, 17 pages.
Wang Tong-tong, "Multi-dimensional Parallel Packet Classification Algorithm," Computer Engineering, vol. 37 No. 18, Sep. 2011, 3 pages (with English abstract).

* cited by examiner

SYSTEM FOR DETERMINING WHETHER TO FORWARD PACKET BASED ON BIT STRING WITHIN THE PACKET

CROSS-REFERENCE TO RELATED APPLICATIONS

This application is a continuation of International Application No. PCT/CN2018/121249, filed on Dec. 14, 2018, which claims priority to Chinese Patent Application No. 201711451081.7, filed on Dec. 27, 2017. The disclosures of the aforementioned applications are hereby incorporated by reference in their entireties.

TECHNICAL FIELD

This application relates to the field of communications technologies, and in particular, to a packet processing method and an apparatus.

BACKGROUND

An internet of things (Internet of Things, IoT) technology has developed rapidly in recent years. In many IoT scenarios, there are a very large quantity of IoT nodes. The IoT node usually performs both data reception and data forwarding, but a hardware capability of the IoT node is usually limited. A storage capability, a computing capability, and the like of the IoT node greatly differ from those of a data node in a conventional network. In addition, in such a scenario, networking is usually performed by using a wireless technology, and resources of a radio link are also very limited.

In the IoT scenario, different service configurations and different policies need to be delivered for devices with different functions in a same network. Because the IoT device usually has a relatively simple function, usually, there is more than one device with a same configuration and policy, in other words, there is a multicast requirement. If an existing multicast technology is used, a complete membership management mechanism and a multicast packet forwarding protocol are required. This requires a relatively high storage capability and computing capability of a node. However, most IoT nodes cannot satisfy the requirement.

SUMMARY

Embodiments of the present invention provide a packet processing method and an apparatus, to resolve a problem that an existing multicast technology requires an extremely high storage capability and computing capability of a node.

According to a first aspect, a packet processing method is provided, including: receiving, by a first node, a first packet, where the first packet carries a first bit string, the first bit string includes M bit sets, each bit set corresponds to one node group, a value of the bit set is used to indicate whether one or more target nodes of the first packet include the corresponding node group, and M is an integer greater than or equal to 1; and determining, by the first node based on the first bit string and a second bit string, whether to send the first packet to a second node, where the second bit string includes N bit sets, each bit set corresponds to one node group, a value of the bit set is used to indicate whether a node belonging to the corresponding node group exists in one or more related nodes of the first node, and N is an integer greater than or equal to 1.

In this embodiment of the present invention, the first node needs to store only the second bit string, without storing a complex forwarding entry, and determines, based on the first bit string and the second bit string, whether to forward the packet. This does not require a high computing capability of the node. In addition, each bit set corresponds to one node group instead of a single node. Therefore, a relatively short bit string may be used to support a large quantity of nodes.

In a possible design, the method further includes: determining, by the first node based on the first bit string and a third bit string, whether the one or more target nodes of the first packet include the first node, where the third bit string includes L bit sets, each bit set corresponds to one node group, a value of the bit set is used to indicate whether the first node belongs to the corresponding node group, and L is an integer greater than or equal to 1.

In this embodiment of the present invention, the first node determines, based on the first bit string and the third bit string, whether the one or more target nodes of the first packet include the first node, and a plurality of bit sets of the third bit string may indicate that whether the first node belongs to a plurality of node groups. Assuming that one node group corresponds to one multicast group, if the first node belongs to a plurality of multicast groups, there is no need to store one third bit string for each multicast group. This has a low storage requirement on the node.

In a possible design, each of the M bit sets is one bit, each of the N bit sets is one bit, and each of the L bit sets is one bit.

In a possible design, the first node includes O child nodes, the O child nodes include the second node, and O is an integer greater than or equal to 1.

In a possible design, the one or more related nodes of the first node include the first node, the O child nodes, and one or more descendant nodes of the O child nodes.

In a possible design, before the determining, by the first node based on the first bit string and a second bit string, whether to send the first packet to a second node, the method further includes: obtaining a bit string corresponding to each of the O child nodes, where the bit string corresponding to each child node includes a plurality of bit sets, each bit set corresponds to one node group, and a value of the bit set is used to indicate whether a node belonging to the corresponding node group exists in the child node and the one or more descendant nodes of the child node; obtaining a third bit string, where the third bit string includes L bit sets, each bit set corresponds to one node group, a value of the bit set is used to indicate whether the first node belongs to the corresponding node group, and L is an integer greater than or equal to 1; and obtaining the second bit string based on the bit string corresponding to each of the O child nodes and the third bit string.

In a possible design, each of the O child nodes corresponds to one second bit string, and the determining, by the first node based on the first bit string and a second bit string, whether to send the first packet to a second node includes: determining, by the first node based on the first bit string and a second bit string corresponding to the second node, whether to send the first packet to the second node, where the one or more related nodes of the first node include the second node and one or more descendant nodes of the second node.

In a possible design, before the determining, by the first node based on the first bit string and a second bit string corresponding to the second node, whether to send the first packet to the second node, the method further includes: obtaining the second bit string corresponding to the second node from the second node; or obtaining the second bit string corresponding to the second node from a management node.

In a possible design, the determining, by the first node based on the first bit string and a second bit string, whether to send the first packet to a second node includes: performing a bitwise AND operation on the first bit string and the second bit string, and determining, based on an operation result, whether to send the first packet to the second node; or performing a bitwise OR operation on the first bit string and the second bit string, and determining, based on an operation result, whether to send the first packet to the second node.

In a possible design, the performing a bitwise AND operation on the first bit string and the second bit string, and determining, based on an operation result, whether to send the first packet to the second node includes: performing the bitwise AND operation on the first bit string and the second bit string, to obtain an updated first bit string, and determining, based on the updated first bit string, whether to send the first packet to the second node; and the performing a bitwise OR operation on the first bit string and the second bit string, and determining, based on an operation result, whether to send the first packet to the second node includes: performing the bitwise OR operation on the first bit string and the second bit string, to obtain an updated first bit string, and determining, based on the updated first bit string, whether to send the first packet to the second node.

In a possible design, a value of M is not equal to a value of N, and before the performing a bitwise AND operation on the first bit string and the second bit string or performing a bitwise OR operation on the first bit string and the second bit string, the method further includes: if M is greater than N, performing a padding operation on the second bit string, or performing a shortening operation on the first bit string; or if M is less than N, performing a padding operation on the first bit string, or performing a shortening operation on the second bit string.

In a possible design, the method further includes: receiving, by the first node, a bit string update message, and determining, based on a destination address of the bit string update message, whether the first node is a destination node of the bit string update message; and if the first node is a destination node of the bit string update message, updating a third bit string of the first node based on the bit string update message; or if the first node is not a destination node of the bit string update message, updating the second bit string of the first node based on the bit string update message.

In a possible design, the L bit sets of the third bit string include a first bit set and a second bit set, the first bit set indicates that the first node belongs to a first node group, and the second bit set indicates that the first node belongs to a second node group.

In a possible design, the M bit sets of the first bit string include a first bit set and a second bit set, the first bit set indicates that the one or more target nodes of the first packet include a first node group, and the second bit set indicates that the one or more target nodes of the first packet include a second node group.

In a possible design, the N bit sets of the second bit string include a first bit set and a second bit set, the first bit set indicates that a node belonging to a first node group exists in the one or more related nodes of the first node, and the second bit set indicates that a node belonging to a second node group exists in the one or more related nodes of the first node.

According to a second aspect, a packet processing method is provided, including: receiving, by a first node, a first packet, where the first packet carries a first bit string, the first bit string includes M bit sets, each bit set corresponds to one node group, a value of the bit set is used to indicate whether one or more target nodes of the first packet include the corresponding node group, and M is an integer greater than or equal to 1; and determining, by the first node based on the first bit string and a third bit string, whether the one or more target nodes of the first packet include the first node, where the third bit string includes L bit sets, each bit set corresponds to one node group, a value of the bit set is used to indicate whether the first node belongs to the corresponding node group, and L is an integer greater than or equal to 1.

In a possible design, the method further includes: determining, by the first node based on the first bit string and a second bit string, whether to send the first packet to a second node, where the second bit string includes N bit sets, each bit set corresponds to one node group, a value of the bit set is used to indicate whether a node belonging to the corresponding node group exists in one or more related nodes of the first node, and N is an integer greater than or equal to 1.

In a possible design, each of the M bit sets is one bit, each of the N bit sets is one bit, and each of the L bit sets is one bit.

In a possible design, the first node includes O child nodes, the O child nodes include the second node, and O is an integer greater than or equal to 1.

In a possible design, the one or more related nodes of the first node include the first node, the O child nodes, and one or more descendant nodes of the O child nodes.

In a possible design, before the determining, by the first node based on the first bit string and a second bit string, whether to send the first packet to a second node, the method further includes: obtaining a bit string corresponding to each of the O child nodes, where the bit string corresponding to each child node includes a plurality of bit sets, each bit set corresponds to one node group, and a value of the bit set is used to indicate whether a node belonging to the corresponding node group exists in the child node and the one or more descendant nodes of the child node; obtaining a third bit string, where the third bit string includes L bit sets, each bit set corresponds to one node group, a value of the bit set is used to indicate whether the first node belongs to the corresponding node group, and L is an integer greater than or equal to 1; and obtaining the second bit string based on the bit string corresponding to each of the O child nodes and the third bit string.

In a possible design, each of the O child nodes corresponds to one second bit string, and the determining, by the first node based on the first bit string and a second bit string, whether to send the first packet to a second node includes: determining, by the first node based on the first bit string and a second bit string corresponding to the second node, whether to send the first packet to the second node, where the one or more related nodes of the first node include the second node and one or more descendant nodes of the second node.

In a possible design, before the determining, by the first node based on the first bit string and a second bit string corresponding to the second node, whether to send the first packet to the second node, the method further includes: obtaining the second bit string corresponding to the second node from the second node; or obtaining the second bit string corresponding to the second node from a management node.

In a possible design, the determining, by the first node based on the first bit string and a second bit string, whether to send the first packet to a second node includes: performing a bitwise AND operation on the first bit string and the second bit string, and determining, based on an operation result, whether to send the first packet to the second node; or performing a bitwise OR operation on the first bit string and the second bit string, and determining, based on an operation result, whether to send the first packet to the second node.

In a possible design, the performing a bitwise AND operation on the first bit string and the second bit string, and determining, based on an operation result, whether to send the first packet to the second node includes: performing the bitwise AND operation on the first bit string and the second bit string, to obtain an updated first bit string, and determining, based on the updated first bit string, whether to send the first packet to the second node; and the performing a bitwise OR operation on the first bit string and the second bit string, and determining, based on an operation result, whether to send the first packet to the second node includes: performing the bitwise OR operation on the first bit string and the second bit string, to obtain an updated first bit string, and determining, based on the updated first bit string, whether to send the first packet to the second node.

In a possible design, a value of M is not equal to a value of N, and before the performing a bitwise AND operation on the first bit string and the second bit string or performing a bitwise OR operation on the first bit string and the second bit string, the method further includes: if M is greater than N, performing a padding operation on the second bit string, or performing a shortening operation on the first bit string; or if M is less than N, performing a padding operation on the first bit string, or performing a shortening operation on the second bit string.

In a possible design, the method further includes: receiving, by the first node, a bit string update message, and determining, based on a destination address of the bit string update message, whether the first node is a destination node of the bit string update message; and if the first node is a destination node of the bit string update message, updating a third bit string of the first node based on the bit string update message; or if the first node is not a destination node of the bit string update message, updating the second bit string of the first node based on the bit string update message.

In a possible design, the L bit sets of the third bit string include a first bit set and a second bit set, the first bit set indicates that the first node belongs to a first node group, and the second bit set indicates that the first node belongs to a second node group.

In a possible design, the M bit sets of the first bit string include a first bit set and a second bit set, the first bit set indicates that the one or more target nodes of the first packet include a first node group, and the second bit set indicates that the one or more target nodes of the first packet include a second node group.

In a possible design, the N bit sets of the second bit string include a first bit set and a second bit set, the first bit set indicates that a node belonging to a first node group exists in the one or more related nodes of the first node, and the second bit set indicates that a node belonging to a second node group exists in the one or more related nodes of the first node.

According to a third aspect, a node is provided, including: a receiver, configured to receive a first packet, where the first packet carries a first bit string, the first bit string includes M bit sets, each bit set corresponds to one node group, a value of the bit set is used to indicate whether one or more target nodes of the first packet include the corresponding node group, and M is an integer greater than or equal to 1; and a processor, configured to determine, based on the first bit string and a second bit string, whether to send the first packet to a second node, where the second bit string includes N bit sets, each bit set corresponds to one node group, a value of the bit set is used to indicate whether a node belonging to the corresponding node group exists in one or more related nodes of the first node, and N is an integer greater than or equal to 1.

In a possible design, the processor is further configured to determine, based on the first bit string and a third bit string, whether the one or more target nodes of the first packet include the first node, where the third bit string includes L bit sets, each bit set corresponds to one node group, a value of the bit set is used to indicate whether the first node belongs to the corresponding node group, and L is an integer greater than or equal to 1.

In a possible design, each of the M bit sets is one bit, each of the N bit sets is one bit, and each of the L bit sets is one bit.

In a possible design, the first node includes O child nodes, the O child nodes include the second node, and O is an integer greater than or equal to 1.

In a possible design, the one or more related nodes of the first node include the first node, the O child nodes, and one or more descendant nodes of the O child nodes.

In a possible design, the receiver is further configured to obtain a bit string corresponding to each of the O child nodes, where the bit string corresponding to each child node includes a plurality of bit sets, each bit set corresponds to one node group, and a value of the bit set is used to indicate whether a node belonging to the corresponding node group exists in the child node and the one or more descendant nodes of the child node; the receiver is further configured to obtain a third bit string, where the third bit string includes L bit sets, each bit set corresponds to one node group, a value of the bit set is used to indicate whether the first node belongs to the corresponding node group, and L is an integer greater than or equal to 1; and the processor is further configured to obtain the second bit string based on the bit string corresponding to each of the O child nodes and the third bit string.

In a possible design, each of the O child nodes corresponds to one second bit string, and the processor is specifically configured to determine, based on the first bit string and a second bit string corresponding to the second node, whether to send the first packet to the second node, where the one or more related nodes of the first node include the second node and one or more descendant nodes of the second node.

In a possible design, the receiver is further configured to obtain the second bit string corresponding to the second node from the second node; or the receiver is further configured to obtain the second bit string corresponding to the second node from a management node.

In a possible design, the processor is specifically configured to: perform a bitwise AND operation on the first bit string and the second bit string, and determine, based on an operation result, whether to send the first packet to the second node; or the processor is specifically configured to: perform a bitwise OR operation on the first bit string and the second bit string, and determine, based on an operation result, whether to send the first packet to the second node.

In a possible design, the processor is specifically configured to: perform the bitwise AND operation on the first bit string and the second bit string, to obtain an updated first bit string, and determine, based on the updated first bit string, whether to send the first packet to the second node; or the processor is specifically configured to: perform the bitwise OR operation on the first bit string and the second bit string, to obtain an updated first bit string, and determine, based on the updated first bit string, whether to send the first packet to the second node.

In a possible design, if M is greater than N, the processor is further configured to perform a padding operation on the second bit string, or the processor is further configured to perform a shortening operation on the first bit string; or if M is less than N, the processor is further configured to perform a padding operation on the first bit string, or the processor is further configured to perform a shortening operation on the second bit string.

In a possible design, the node further includes: receiving, by the first node, a bit string update message, and determining, based on a destination address of the bit string update message, whether the first node is a destination node of the bit string update message; and if the first node is a destination node of the bit string update message, updating a third bit string of the first node based on the bit string update message; or if the first node is not a destination node of the bit string update message, updating the second bit string of the first node based on the bit string update message.

In a possible design, the L bit sets of the third bit string include a first bit set and a second bit set, the first bit set indicates that the first node belongs to a first node group, and the second bit set indicates that the first node belongs to a second node group.

In a possible design, the M bit sets of the first bit string include a first bit set and a second bit set, the first bit set indicates that the one or more target nodes of the first packet include a first node group, and the second bit set indicates that the one or more target nodes of the first packet include a second node group.

In a possible design, the N bit sets of the second bit string include a first bit set and a second bit set, the first bit set indicates that a node belonging to a first node group exists in the one or more related nodes of the first node, and the second bit set indicates that a node belonging to a second node group exists in the one or more related nodes of the first node.

According to a fourth aspect, a node is provided, where the node includes: a receiver, configured to receive a first packet, where the first packet carries a first bit string, the first bit string includes M bit sets, each bit set corresponds to one node group, a value of the bit set is used to indicate whether one or more target nodes of the first packet include the corresponding node group, and M is an integer greater than or equal to 1; and a processor, configured to determine, based on the first bit string and a third bit string, whether the one or more target nodes of the first packet include the first node, where the third bit string includes L bit sets, each bit set corresponds to one node group, a value of the bit set is used to indicate whether the first node belongs to the corresponding node group, and L is an integer greater than or equal to 1.

In a possible design, the processor is further configured to determine, based on the first bit string and a second bit string, whether to send the first packet to a second node, where the second bit string includes N bit sets, each bit set corresponds to one node group, a value of the bit set is used to indicate whether a node belonging to the corresponding node group exists in one or more related nodes of the first node, and N is an integer greater than or equal to 1.

In a possible design, each of the M bit sets is one bit, each of the N bit sets is one bit, and each of the L bit sets is one bit.

In a possible design, the first node includes O child nodes, the O child nodes include the second node, and O is an integer greater than or equal to 1.

In a possible design, the one or more related nodes of the first node include the first node, the O child nodes, and one or more descendant nodes of the O child nodes.

In a possible design, the receiver is further configured to obtain a bit string corresponding to each of the O child nodes, where the bit string corresponding to each child node includes a plurality of bit sets, each bit set corresponds to one node group, and a value of the bit set is used to indicate whether a node belonging to the corresponding node group exists in the child node and the one or more descendant nodes of the child node; the receiver is further configured to obtain a third bit string, where the third bit string includes L bit sets, each bit set corresponds to one node group, a value of the bit set is used to indicate whether the first node belongs to the corresponding node group, and L is an integer greater than or equal to 1; and the processor is further configured to obtain the second bit string based on the bit string corresponding to each of the O child nodes and the third bit string.

In a possible design, each of the O child nodes corresponds to one second bit string, and the processor is specifically configured to determine, based on the first bit string and a second bit string corresponding to the second node, whether to send the first packet to the second node, where the one or more related nodes of the first node include the second node and one or more descendant nodes of the second node.

In a possible design, the receiver is further configured to obtain the second bit string corresponding to the second node from the second node; or the receiver is further configured to obtain the second bit string corresponding to the second node from a management node.

In a possible design, the processor is specifically configured to: perform a bitwise AND operation on the first bit string and the second bit string, and determine, based on an operation result, whether to send the first packet to the second node; or the processor is specifically configured to: perform a bitwise OR operation on the first bit string and the second bit string, and determine, based on an operation result, whether to send the first packet to the second node.

In a possible design, the processor is specifically configured to: perform the bitwise AND operation on the first bit string and the second bit string, to obtain an updated first bit string, and determine, based on the updated first bit string, whether to send the first packet to the second node; or the processor is specifically configured to: perform the bitwise OR operation on the first bit string and the second bit string, to obtain an updated first bit string, and determine, based on the updated first bit string, whether to send the first packet to the second node.

In a possible design, if M is greater than N, the processor is further configured to perform a padding operation on the second bit string, or the processor is further configured to perform a shortening operation on the first bit string; or if M is less than N the processor is further configured to perform a padding operation on the first bit string, or the processor is further configured to perform a shortening operation on the second bit string.

In a possible design, the node further includes: receiving, by the first node, a bit string update message, and determining, based on a destination address of the bit string update message, whether the first node is a destination node of the bit string update message; and if the first node is a destination node of the bit string update message, updating a third bit string of the first node based on the bit string update message; or if the first node is not a destination node of the bit string update message, updating the second bit string of the first node based on the bit string update message.

In a possible design, the L bit sets of the third bit string include a first bit set and a second bit set, the first bit set indicates that the first node belongs to a first node group, and the second bit set indicates that the first node belongs to a second node group.

In a possible design, the M bit sets of the first bit string include a first bit set and a second bit set, the first bit set indicates that the one or more target nodes of the first packet include a first node group, and the second bit set indicates that the one or more target nodes of the first packet include a second node group.

In a possible design, the N bit sets of the second bit string include a first bit set and a second bit set, the first bit set indicates that a node belonging to a first node group exists in the one or more related nodes of the first node, and the second bit set indicates that a node belonging to a second node group exists in the one or more related nodes of the first node.

According to a fifth aspect, a node is provided, where the node includes a processor and a memory, the memory is configured to store a program, and the processor invokes the program stored in the memory, to perform the method according to the first aspect of the present invention.

According to a sixth aspect, a node is provided, where the node includes a processor and a memory, the memory is configured to store a program, and the processor invokes the program stored in the memory, to perform the method according to the second aspect of the present invention.

According to a seventh aspect, a node is provided, where the node includes at least one processing element (or chip) configured to perform the method according to the first aspect.

According to an eighth aspect, a node is provided, where the node includes at least one processing element (or chip) configured to perform the method according to the second aspect.

According to a ninth aspect, a computer storage medium is provided, including a program, where the program is used to perform the method according to the first aspect.

According to a tenth aspect, a computer storage medium is provided, including a program, where the program is used to perform the method according to the second aspect.

DESCRIPTION OF EMBODIMENTS

Figure 1:
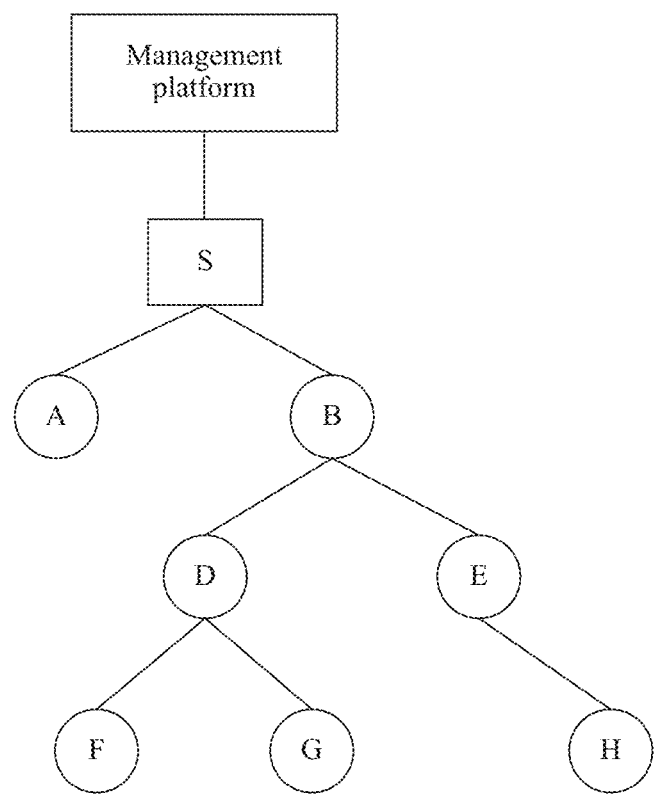
FIG. 1 is a schematic structural diagram of a network according to an embodiment of the present invention.

To make the objectives, technical solutions, and advantages of the present invention clearer and more comprehensible, the following further describes the present invention in detail with reference to the accompanying drawings and embodiments.

Before the technical solutions of the embodiments of this application are described, several technical terms in the embodiments of this application are described first.

Multicast: A point-to-multipoint network connection is implemented between a sender and all recipients. If a sender simultaneously transmits same data to a plurality of recipients, the sender needs to copy a same data packet only once. For example, in an IP network, a data packet is sent to a determined node set (namely, a multicast group) in a best effort form. A basic idea of multicast is as follows: A multicast source sends only one piece of data, and all recipients in a multicast group can receive copies of the same data. In addition, only a host in the multicast group can receive the data, and other hosts cannot receive the data.

Tree network topology: The tree network topology is in a shape of an inverted tree, where a root is at the top of the tree, branches are below the root, and each branch may further have a subbranch. A parent node may be connected to a plurality of child nodes, a child node may also functions as a parent node and be connected to a plurality of child nodes, and the child node and the parent node are relative concepts.

Uplink: A direction from a child node to a parent node is referred to as uplink.

Downlink: A direction from a parent node to a child node is referred to as downlink.

Binary digit (binary digit, bit): The binary digit may also be referred to as a bit, is a minimum unit for representing information, is information included in one bit of a binary number or an amount of required information of specified one of two options, and has only two states: 0 and 1. The two values may also be interpreted as logical values (true/false or yes/no), algebraic signs (+/−), active states (on/off), or any other two-valued attribute.

Bit string: The bit string is also referred to as a bit string, and a plurality of bits are combined into the bit string.

Bit set: One or more bits may constitute one bit set, and if a plurality of bits constitute one bit set, the plurality of bits may be consecutive bits or may be discrete bits. One bit string may include one or more bit sets. One bit set corresponds to one node group, and a value of the bit set is used to indicate whether a node belongs to the corresponding node group or whether the corresponding node group is a target node group.

Node group: One or more nodes may belong to one node group, the node group represents a grouping relationship between nodes in a network, and one node may belong to one node group or may belong to a plurality of node groups.

First bit string: The first bit string is a bit string carried in a packet received by a node, for example, a first node. The first bit string includes M bit sets, each bit set corresponds to one node group, a value of the bit set is used to indicate whether one or more target nodes of a first packet include the corresponding node group, and M is an integer greater than or equal to 1.

Second bit string: The second bit string is a local bit string of the first node. The second bit string includes N bit sets, each bit set corresponds to one node group, a value of the bit set is used to indicate whether a node belonging to the corresponding node group exists in one or more related nodes of the first node, and N is an integer greater than or equal to 1.

Third bit string: The third bit string is a local bit string of the first node. The third bit string includes L bit sets, each bit set corresponds to one node group, a value of the bit set is used to indicate whether the first node belongs to the corresponding node group, and L is an integer greater than or equal to 1.

FIG. 1 is a schematic structural diagram of a network according to an embodiment of the present invention. A topology of the network is a tree topology, and includes a management platform, a node S, a node A, a node B, a node D, a node E, a node F, a node G, and a node H. One node is connected to one or more child nodes. For example, the node S is connected to two child nodes: the node A and the node B. Some child nodes are further connected to one or more child nodes. For example, the node B is further connected to the node D and the node E. In the network of the tree topology, a node has uplink and downlink communication directions. On uplink, a child node sends data to a parent node or another ancestor node. On downlink, a parent node sends data to a child node or another descendant node. As shown in FIG. 1, the node D is a downlink node (a child node) of the node B, and the node B is an uplink node (a parent node) of the node D. A child node of a node, a child node of the child node, and so on are referred to as descendant nodes of the node. For example, descendant nodes of the node B include the node D, the node E, the node F, the node Q and the node H.

The tree topology shown in FIG. 1 may be a topology of the network. For example, networking may be performed by using a routing protocol for low-power and lossy networks (Routing Protocol for Low-Power and Lossy Networks, RPL). Alternatively, the tree topology shown in FIG. 1 may be an overlay (overlay) tree logical topology generated based on the topology of the network. A physical topology of the network may be any topology.

The embodiments of the present invention may be applied to the network of the tree topology shown in FIG. 1, or may be applied to a network of another topology, provided that there are determined uplink and downlink relationships between nodes, that is, there is one or more determined uplink and downlink paths between the nodes. For example, in FIG. 1, the node G is configured as a child node of the node B, and consequently the network topology is not a tree topology, but the embodiments of the present invention may still be used. Because there is the determined uplink or downlink relationship, it may be determined, based on information about a related node, whether to forward a packet.

The embodiments of the present invention may be applied to an IoT scenario, but are not limited to the IoT scenario, and may also be used in another network scenario. This is not limited in the embodiments of the present invention.

Figure 2:
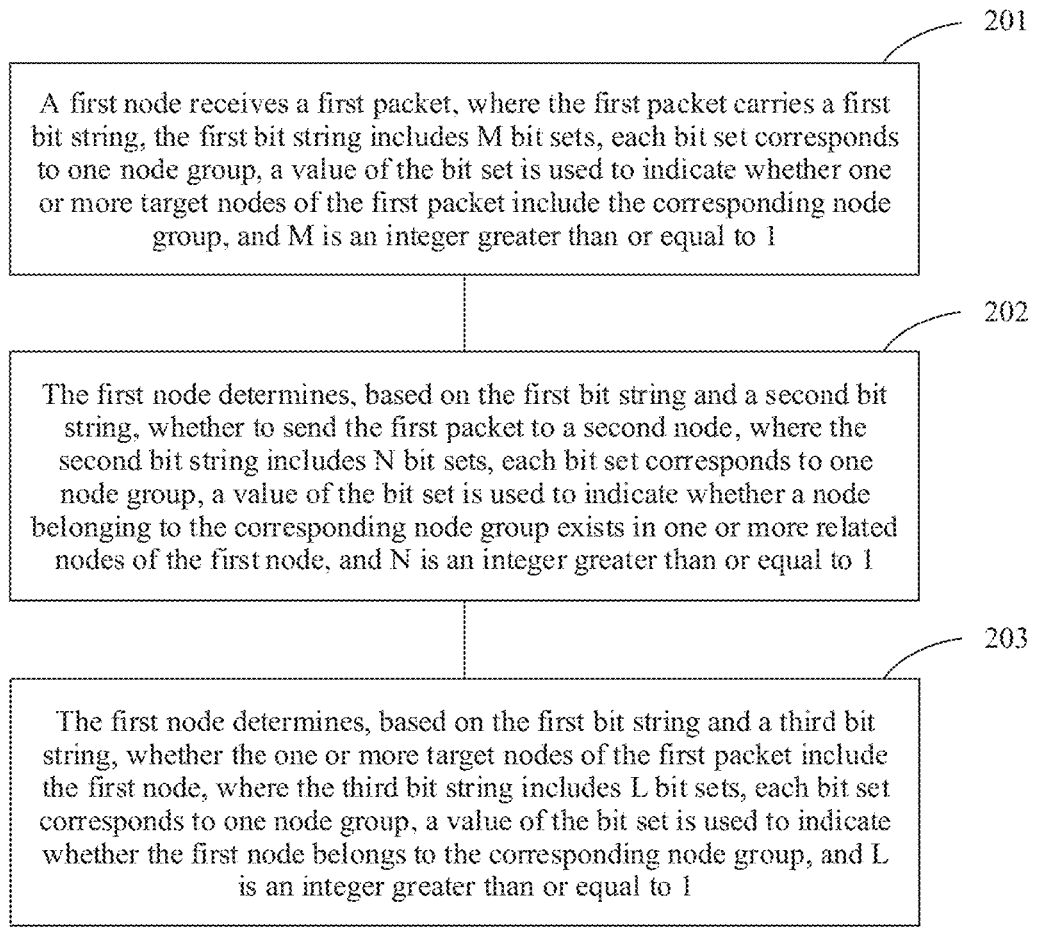
FIG. 2 is a schematic flowchart of a packet processing method according to an embodiment of the present invention.

FIG. 2 is a schematic flowchart of a packet processing method according to an embodiment of the present invention. The method includes the following steps.

S201. A first node receives a first packet, where the first packet carries a first bit string, the first bit string includes M bit sets, each bit set corresponds to one node group, a value of the bit set is used to indicate whether one or more target nodes of the first packet include the corresponding node group, and M is an integer greater than or equal to 1.

The first node may be any node in FIG. 1, for example, may be the node B, and the node B receives a first packet from the node S.

Each bit set may include one bit. For example, the first bit string is 01000, including five bit sets, where 0 indicates no; 1 indicates yes: and from right to left, values of the first bit set, the second bit set, the third bit set, and the fifth bit set are 0, and a value of the fourth bit set is 1. This indicates that the one or more target nodes of the first packet include a node group corresponding to the fourth bit set, and do not include a node group corresponding to the first bit set, the second bit set, the third bit set, or the fifth bit set.

Alternatively, each bit set may include a plurality of bits. For example, the first bit string is 1100, including two bit sets, where each bit set includes two bits; 00 indicates no; 11 indicates yes: from right to left, the first bit and the second bit constitute the first bit set, and the third bit and the fourth bit constitute the second bit set: a value of the first bit set is 00; and a value of the second bit set is 11. This indicates that the one or more target nodes of the first packet include a node group corresponding to the second bit set, and do not include a node group corresponding to the first bit set.

Each bit set includes a plurality of bits, and bits included in different bit sets may overlap. For example, the first bit string is 111, including two bit sets, where each bit set includes two bits; 00 indicates no: 11 indicates yes; from right to left, the first bit and the second bit constitute the first bit set, and the first bit and the third bit constitute the second bit set; a value of the first bit set is 11: and a value of the second bit set is 11. This indicates that the one or more target nodes of the first packet include node groups corresponding to the first bit set and the second bit set.

In one bit string, different bit sets may include a same quantity of bits or different quantities of bits. For one bit set, all ones may be used to indicate positive, and all zeros may be used to indicate negative: or all zeros may be used to indicate positive, and all ones may be used to indicate negative; or a combination of zero and one may be used to indicate positive, and another combination of zero and one may be used to indicate negative. In addition, different bit sets may be indicated in a same manner or in different manners.

S202. The first node determines, based on the first bit string and a second bit string, whether to send the first packet to a second node, where the second bit string includes N bit sets, each bit set corresponds to one node group, a value of the bit set is used to indicate whether a node belonging to the corresponding node group exists in one or more related nodes of the first node, and N is an integer greater than or equal to 1.

The second node may be a child node of the node B in FIG. 1, for example, may be the node D.

Each bit set may include one bit. For example, the second bit string is 01000, including five bit sets, where 0 indicates no; 1 indicates yes; and from right to left, values of the first bit set, the second bit set, the third bit set, and the fifth bit set are 0, and a value of the fourth bit set is 1. This indicates that a node belonging to a node group corresponding to the fourth bit set exists in the one or more related nodes of the first node, and no node belonging to a node group corresponding to the first bit set, the second bit set, the third bit set, or the fifth bit set exists in the one or more related nodes of the first node.

Alternatively, each bit set may include a plurality of bits. For example, the second bit string is 1100, including two bit sets, where each bit set includes two bits; 00 indicates no; 11 indicates yes; from right to left, the first bit and the second bit constitute the first bit set, and the third bit and the fourth bit constitute the second bit set; a value of the first bit set is 00 and a value of the second bit set is 11. This indicates that a node belonging to a node group corresponding to the second bit set exists in the one or more related nodes of the first node, and no node belonging to a node group corresponding to the second bit set exists in the one or more related nodes of the first node.

Each bit set includes a plurality of bits, and bits included in different bit sets may overlap. For example, the second bit string is 111, including two bit sets, where each bit set includes two bits; 00 indicates no; 11 indicates yes; from right to left, the first bit and the second bit constitute the first bit set, and the first bit and the third bit constitute the second bit set; a value of the first bit set is 1: and a value of the second bit set is 11. This indicates that a node belonging to a node group corresponding to the first set and a node belonging to a node group corresponding to the second set exist in the one or more related nodes of the first node.

In one bit string, different bit sets may include a same quantity of bits or different quantities of bits. For one bit set, all ones may be used to indicate positive, and all zeros may be used to indicate negative: or all zeros may be used to indicate positive, and all ones may be used to indicate negative; or a combination of zero and one may be used to indicate positive, and another combination of zero and one may be used to indicate negative. In addition, different bit sets may be indicated in a same manner or in different manners.

A length of the second bit string may be the same as or may be different from a length of the first bit string.

A correspondence between the bit sets and the node groups in the second bit string is the same as a correspondence between the bit sets and the node groups in the first bit string. For example, the second bit string is 01100, where 0 indicates no; 1 indicates yes, the second bit string includes five bit sets; from right to left, the first bit is the first bit set, the second bit is the second bit set, the third bit is the third bit set, the fourth bit is the fourth bit set, and the fifth bit is the fifth bit set; and the first bit set corresponds to a node group 1, the second bit set corresponds to a node group 2, the third bit set corresponds to a node group 3, the fourth bit set corresponds to a node group 4, and the fifth bit set corresponds to a node group 5; and the first bit string is 01000, where 0 indicates no; 1 indicates yes; the first bit string includes five bit sets; from right to left, the first bit is the first bit set, the second bit is the second bit set, the third bit is the third bit set, the fourth bit is the fourth bit set, and the fifth bit is the fifth bit set: and the first bit set corresponds to a node group 1, the second bit set corresponds to a node group 2, the third bit set corresponds to a node group 3, the fourth bit set corresponds to a node group 4, and the fifth bit set corresponds to a node group 5. Because the correspondences are the same, a bitwise AND method may be used to determine whether to forward the first packet. In some embodiments, another bitwise operation may be used to determine whether to forward the first packet. Certainly, in some embodiments, the correspondence between the bit sets and the node groups in the second bit string may be different from the correspondence between the bit sets and the node groups in the first bit string. In this case, a bitwise operation cannot be directly performed.

S203. The first node determines, based on the first bit string and a third bit string, whether the one or more target nodes of the first packet include the first node, where the third bit string includes L bit sets, each bit set corresponds to one node group, a value of the bit set is used to indicate whether the first node belongs to the corresponding node group, and L is an integer greater than or equal to 1.

Each bit set may include one bit. For example, the third bit string is 01000, including five bit sets, where 0 indicates no: 1 indicates yes; and from right to left, values of the first bit set, the second bit set, the third bit set, and the fifth bit set are 0, and a value of the fourth bit set is 1. This indicates that the first node belongs to a node group corresponding to the fourth bit set, and does not belong to a node group corresponding to the first bit set, the second bit set, the third bit set, or the fifth bit set.

Alternatively, each bit set may include a plurality of bits. For example, the third bit string is 1100, including two bit sets, where each bit set includes two bits: 00 indicates no; 11 indicates yes; from right to left, the first bit and the second bit constitute the first bit set, and the third bit and the fourth bit constitute the second bit set: a value of the first bit set is 00; and a value of the second bit set is 11. This indicates that the first node belongs to a node group corresponding to the second bit set, and does not belong to a node group corresponding to the first bit set.

Each bit set includes a plurality of bits, and bits included in different bit sets may overlap. For example, the third bit string is 111, including two bit sets, where each bit set includes two bits; 00 indicates no; 11 indicates yes; from right to left, the first bit and the second bit constitute the first bit set, and the first bit and the third bit constitute the second bit set; a value of the first bit set is 11; and a value of the second bit set is 11. This indicates that the first node belongs to node groups corresponding to the first bit set and the second bit set.

In one bit string, different bit sets may include a same quantity of bits or different quantities of bits. For one bit set, all ones may be used to indicate positive, and all zeros may be used to indicate negative: or all zeros may be used to indicate positive, and all ones may be used to indicate negative; or a combination of zero and one may be used to indicate positive, and another combination of zero and one may be used to indicate negative. In addition, different bit sets may be indicated in a same manner or in different manners.

A length of the third bit string may be the same as or may be different from the length of the first bit string.

A correspondence between the bit sets and the node groups in the third bit string is the same as the correspondence between the bit sets and the node groups in the first bit string. For example, the third bit string is 01100, where 0 indicates no: 1 indicates yes; the third bit string includes five bit sets; from right to left, the first bit is the first bit set, the second bit is the second bit set, the third bit is the third bit set, the fourth bit is the fourth bit set, and the fifth bit is the fifth bit set; and the first bit set corresponds to a node group 1, the second bit set corresponds to a node group 2, the third bit set corresponds to a node group 3, the fourth bit set corresponds to a node group 4, and the fifth bit set corresponds to a node group 5; and the first bit string is 01000, where 0 indicates no; 1 indicates yes; the first bit string includes five bit sets; from right to left, the first bit is the first bit set, the second bit is the second bit set, the third bit is the third bit set, the fourth bit is the fourth bit set, and the fifth bit is the fifth bit set; and the first bit set corresponds to a node group 1, the second bit set corresponds to a node group 2, the third bit set corresponds to a node group 3, the fourth bit set corresponds to a node group 4, and the fifth bit set corresponds to a node group 5. Because the correspondences are the same, a bitwise AND method may be used to determine whether to forward the first packet. Certainly, in some embodiments, the correspondence between the bit sets and the node groups in the third bit string may be different from the correspondence between the bit sets and the node groups in the first bit string.

In this embodiment of the present invention, S202 may be performed before S203, or S203 may be performed before S202, or S202 may be performed and S203 may not be performed, or S203 may be performed and S202 may not be performed. This is not limited in this embodiment of the present invention.

The one or more related nodes of the first node vary with a second bit string indication method. Two typical second bit string indication methods are provided below. In a first indication method, the one or more related nodes of the first node include the first node. In a second indication method, the one or more related nodes of the first node do not include the first node. In a tree topology or a tree-like topology, the first node may include O child nodes, the O child nodes include the second node, and O is an integer greater than or equal to 1; and the second node may also include a child node, and so on, and all these nodes are referred to as descendant nodes of the second node. In the first indication method, the one or more related nodes of the first node include the first node, the O child nodes, and one or more descendant nodes of the O child nodes. In the second indication method, each child node corresponds to one second bit string, and for a second bit string corresponding to the second node, the one or more related nodes of the first node include the second node and one or more related nodes of the second node. Alternatively, the second bit string may be indicated by using another method. For example, the one or more related nodes of the first node include the O child nodes and one or more descendant nodes of the O child nodes, and do not include the first node.

In the following embodiments, unless otherwise specified, the first bit string, the second bit string, and the third bit string are equal in length and are equal in a quantity of included bit sets, each bit set includes only one bit, 1 is used to indicate positive, 0 is used to indicate negative, the correspondence between the bit sets and the node groups in the second bit string is the same as the correspondence between the bit sets and the node groups in the first bit string, and the correspondence between the bit sets and the node groups in the third bit string is the same as the correspondence between the bit sets and the node groups in the first bit string.

Table 1 is a schematic table of a second bit string and a third bit string according to an embodiment of the present invention, and shows an example of a second bit string and a third bit string that are locally stored in each node shown in FIG. 1. The nodes in FIG. 1 are divided into four node groups. The node A and the node H belong to a node group 1, the node B belongs to a node group 2, the node E and the node F belong to a node group 3, and the node D and the node G belong to a node group 4. Therefore, third bit strings of the node A and the node H are both 0001, a third bit string of the node B is 0010, third bit strings of the node E and the node F are both 0100, and third bit strings of the node D and the node G are both 1000. In the schematic table of Table 1, one child node corresponds to one second bit string. Specifically, the node D has two second bit strings: a second bit string 0100 corresponding to the node F and a second bit string 1000 corresponding to the node G A related node in the second bit string corresponding to the node F includes the node F, and a related node in the second bit string corresponding to the node G includes the node G The node E has one second bit string: a second bit string 0001 corresponding to the node H, and a related node in the second bit string corresponding to the node H includes the node H. The node B has two second bit strings: a second bit string 1100 corresponding to the node D and a second bit string 0101 corresponding to the node E. Related nodes in the second bit string corresponding to the node D include the node D, the node F, and the node G and related nodes in the second bit string corresponding to the node E include the node E and the node H. The node S has two second bit strings: a second bit string 0001 corresponding to the node A and a second bit string 1111 corresponding to the node B. A related node in the second bit string corresponding to the node A includes the node A, and related nodes in the second bit string corresponding to the node B include the node B, the node D, the node F, the node G, the node E, and the node H. In the embodiment shown in Table 1, each child node corresponds to one second bit string, that is, the second indication method for the second bit string is used.

In the embodiment shown in Table 1, the second bit strings and the third bit strings of all the nodes are equal in length, but in some embodiments, may not be equal in length. Only the rightmost bit to a most significant bit that indicates information about a third bit string of each node may be stored. For example, the third bit string of the node B is 0010, and may be stored as 10 only, and subsequently 0 may be padded before 10 based on a maximum length as required, to obtain 0010.

TABLE 1

| Node | Second bit string | Third bit string |
|------|-------------------|------------------|
| S    | A: 0001           |                  |
|      | B: 1111           |                  |
| A    |                   | 0001             |
| B    | D: 1100           | 0010             |
|      | E: 0101           |                  |
| D    | F: 0100           | 1000             |
|      | G: 1000           |                  |
| E    | H: 0001           | 0100             |
| F    |                   | 0100             |
| G    |                   | 1000             |
| H    |                   | 0001             |

The following provides detailed descriptions by using an example in which there is one target node group of a multicast packet. Embodiment A:

Step A1: Each node stores a second bit string and a third bit string of the node.

Step A2: The management platform sends a multicast packet to the node group 3, where the packet carries a first bit string, and the first bit string is 0100, indicating that target nodes of the multicast packet include the node group 3 and do not include the node group 1, 2, or 4.

Step A3: The node S receives the multicast packet from the management platform; performs bitwise AND on the first bit string 0100 and the second bit string 0001 that corresponds to the node A, that is, 0100&0001=0000, to obtain bits that are all zeros, and determines not to forward the multicast packet to the node A; and performs bitwise AND on the first bit string 0100 and the second bit string 1111 that corresponds to the node B, that is, 0100&1111=0100, to obtain bits that are not all zeros, and determines to forward the multicast packet to the node B. The node S has no third bit string, and therefore does not need to determine whether the target nodes of the multicast packet include the node S.

Step A4: The node B receives the multicast packet from the node S; performs bitwise AND on the first bit string 0100 and the second bit string 1100 that corresponds to the node D, that is, 0100&1100=0100, to obtain bits that are not all zeros, and determines to forward the multicast packet to the node D; and performs bitwise AND on the first bit string 0100 and the second bit string 0101 that corresponds to the node E, that is, 0100&0101=0100, to obtain bits that are not all zeros, and determines to forward the multicast packet to the node E. The node B performs bitwise AND on the first bit string 0100 and the third bit string 0010 of the node B, that is, 0100&0010=0000, to obtain bits that are all zeros, and determines that the node B is not a target node of the multicast packet, in other words, the target nodes of the multicast packet do not include the node B.

Step A5: After receiving the multicast packet from the node B, the node D performs operations in a manner similar to that of the node B, determines to forward the multicast packet to the node F, determines not to forward the multicast packet to the node Q and determines that the node D is not a target node of the multicast packet. After receiving the multicast packet from the node B, the node E performs operations in a manner similar to that of the node B, determines not to forward the multicast packet to the node H, and determines that the node E is a target node of the multicast packet: and receives the multicast packet and reports the multicast packet to a CPU for processing.

Step A6. After receiving the multicast packet from the node D, the node F performs an operation in a manner similar to that of the node B, and because the node F has no corresponding second bit string, the node F determines not to forward the multicast packet, determines that the node F is a target node of the multicast packet, and receives the multicast packet and reports the multicast packet to the CPU for processing.

The following provides detailed descriptions by using an example in which there are two target node groups of a multicast packet. Embodiment B:

Step B1: Each node stores a second bit string and a third bit string of the node.

Step B2: The management platform sends a multicast packet to the node group 1 and the node group 3, where the packet carries a first bit string, and the first bit string is 0101, indicating that target nodes of the multicast packet include the node group 1 and the node group 3 and do not include the node group 2 or 4.

Step B3: The node S receives the multicast packet from the management platform; performs bitwise AND on the first bit string 0101 and the second bit string 0001 that corresponds to the node A, that is, 0101&0001=0001, to obtain bits that are not all zeros, and determines to forward the multicast packet to the node A: and performs bitwise AND on the first bit string 0101 and the second bit string 1111 that corresponds to the node B, that is, 0101&1111=0101, to obtain bits that are not all zeros, and determines to forward the multicast packet to the node B. The node S has no third bit string, and therefore does not need to determine whether the target nodes of the multicast packet include the node S.

Step B4: The node B receives the multicast packet from the node S; performs bitwise AND on the first bit string 0101 and the second bit string 1100 that corresponds to the node D, that is, 0101&1100=0100, to obtain bits that are not all zeros, and determines to forward the multicast packet to the node D; and performs bitwise AND on the first bit string 0101 and the second bit string 0101 that corresponds to the node E, that is, 0101&0101=0101, to obtain bits that are not all zeros, and determines to forward the multicast packet to the node E. The node B performs bitwise AND on the first bit string 0101 and the third bit string 0010 of the node B, that is, 0101&0010=0000, to obtain bits that are all zeros, and determines that the node B is not a target node of the multicast packet, in other words, the target nodes of the multicast packet do not include the node B. After receiving the multicast packet from the node S, the node A performs an operation in a manner similar to that of the node B, and because the node A has no corresponding second bit string, the node A determines not to forward the multicast packet, determines that the node A is a target node of the multicast packet, and receives the multicast packet and reports the multicast packet to a CPU for processing.

Step B5: After receiving the multicast packet from the node B, the node D performs operations in a manner similar to that of the node B, determines to forward the multicast packet to the node F, determines not to forward the multicast packet to the node Q and determines that the node D is not a target node of the multicast packet. After receiving the multicast packet from the node B, the node E performs operations in a manner similar to that of the node B, determines to forward the multicast packet to the node H, and determines that the node E is a target node of the multicast packet; and receives the multicast packet and reports the multicast packet to a CPU for processing.

Step B6: After receiving the multicast packet from the node D, the node F performs an operation in a manner similar to that of the node B, and because the node F has no corresponding second bit string, the node F determines not to forward the multicast packet, determines that the node F is a target node of the multicast packet, and receives the multicast packet and reports the multicast packet to the CPU for processing.

Table 2 is another schematic table of a second bit string and a third bit string according to an embodiment of the present invention, and shows an example of a second bit string and a third bit string that are locally stored in each node shown in FIG. 1. The nodes in FIG. 1 are divided into four node groups. The node A and the node H belong to a node group 1, the node B belongs to a node group 2, the node E and the node F belong to a node group 3, and the node D and the node G belong to a node group 4. Therefore, third bit strings of the node A and the node H are both 0001, a third bit string of the node B is 0010, third bit strings of the node E and the node F are both 0100, and third bit strings of the node D and the node G are both 1000. In the schematic table of Table 2, each node stores one second bit string. Specifically, a second bit string of the node F is 0100, and a related node in the second bit string of the node F includes the node F: a second bit string of the node G is 1000, and a related node in the second bit string of the node G includes the node G; a second bit string of the node H is 0001, and a related node in the second bit string of the node H is the node H; and a second bit string of the node A is 0001, and a related node in the second bit string of the node A is the node A. A second bit string of the node D is 1100, and related nodes in the second bit string of the node D include the nodes D, F, and G A second bit string of the node E is 0101, and related nodes in the second bit string of the node E include the nodes E and H. A second bit string of the node B is 1111, and related nodes in the second bit string of the node B include the nodes B, D, F, G E, and H. A second bit string of the node S is 1111, and related nodes in the second bit string of the node S include the nodes S, A, B, D, F, C E, and H. In the embodiment shown in Table 2, each node has one second bit string, that is, the first indication method for the second bit string is used.

TABLE 2

| Node | Second bit string | Third bit string |
|------|-------------------|------------------|
| S    | 1111              |                  |
| A    | 0001              | 0001             |
| B    | 1111              | 0010             |
| D    | 1100              | 1000             |
| E    | 0101              | 0100             |
| F    | 0100              | 0100             |
| G    | 1000              | 1000             |
| H    | 0001              | 0001             |

The following provides detailed descriptions by using an example in which there is one target node group of a multicast packet. Embodiment C:

Step C1: Each node stores a second bit string and a third bit string of the node.

Step C2: The management platform sends a multicast packet to the node group 3, where the packet carries a first bit string, and the first bit string is 0100, indicating that target nodes of the multicast packet include the node group 3 and do not include the node group 1, 2, or 4.

Step C3: The node S receives the multicast packet from the management platform, performs bitwise AND on the first bit string 0100 and the second bit string 1111, that is, 0100&1111=0100, to obtain bits that are not all zeros, and determines to forward the multicast packet to all child nodes, that is, forward the multicast packet to the node A and the node B. The node S has no third bit string, and therefore does not need to determine whether the target nodes of the multicast packet include the node S.

Step C4: The node B receives the multicast packet from the node S, performs bitwise AND on the first bit string 0100 and the second bit string 1111, that is, 0100&1111=0100, to obtain bits that are not all zeros, and determines to forward the multicast packet to all child nodes, that is, forward the multicast packet to the node D and the node E. The node B performs bitwise AND on the first bit string 0100 and the third bit string 0010 of the node B, that is, 0100&0010=0000, to obtain bits that are all zeros, and determines that the node B is not a target node of the multicast packet, in other words, the target nodes of the multicast packet do not include the node B. The node A receives the multicast packet from the node S, and because the node A has no child node, the node A does not need to determine whether to forward the multicast packet. The node A performs bitwise AND on the first bit string 0100 and the third bit string 0001 of the node A, that is, 0100&0001=000, to obtain bits that are all zeros, and determines that the node A is not a target node of the multicast packet, in other words, the target nodes of the multicast packet do not include the node A.

Step C5: After receiving the multicast packet from the node B, the node D performs operations in a manner similar to that of the node B, determines to forward the multicast packet to all child nodes, that is, forward the multicast packet to the node F and the node G and determines that the node D is not a target node of the multicast packet. After receiving the multicast packet from the node B, the node E performs operations in a manner similar to that of the node B, determines to forward the multicast packet to all child nodes, that is, forward the multicast packet to the node H, and determines that the node E is a target node of the multicast packet; and receives the multicast packet and reports the multicast packet to a CPU for processing.

Step C6: After receiving the multicast packet from the node D, the node F performs an operation in a manner similar to that of the node A and determines that the node F is a target node of the multicast packet; and receives the multicast packet and reports the multicast packet to the CPU for processing. Because the node F has no child node, the node F does not need to determine whether to forward the multicast packet. After receiving the multicast packet from the node D, the node G performs an operation in a manner similar to that of the node A, and determines that the node G is not a target node of the multicast packet. Because the node G has no child node, the node G does not need to determine whether to forward the multicast packet. After receiving the multicast packet from the node E, the node H performs an operation in a manner similar to that of the node A, and determines that the node H is not a target node of the multicast packet. Because the node H has no child node, the node H does not need to determine whether to forward the multicast packet.

The following provides detailed descriptions by using an example in which there are two target node groups of a multicast packet. Embodiment D:

Step D1: Each node stores a second bit string and a third bit string of the node.

Step D2: The management platform sends a multicast packet to the node group 1 and the node group 3, where the packet carries a first bit string, and the first bit string is 0101, indicating that target nodes of the multicast packet include the node group 1 and the node group 3 and do not include the node group 2 or 4.

Step D3: The node S receives the multicast packet from the management platform, performs bitwise AND on the first bit string 0101 and the second bit string 1111, that is, 0101&1111=0101, to obtain bits that are not all zeros, and determines to forward the multicast packet to all child nodes, that is, forward the multicast packet to the node A and the node B. The node S has no third bit string, and therefore does not need to determine whether the target nodes of the multicast packet include the node S.

Step D4: The node B receives the multicast packet from the node S, performs bitwise AND on the first bit string 0101 and the second bit string 1111, that is, 0101&1111=0101, to obtain bits that are not all zeros, and determines to forward the multicast packet to all child nodes, that is, forward the multicast packet to the node D and the node E. The node B performs bitwise AND on the first bit string 0101 and the third bit string 0010 of the node B, that is, 0101&0010=0000, to obtain bits that are all zeros, and determines that the node B is not a target node of the multicast packet, in other words, the target nodes of the multicast packet do not include the node B. The node A receives the multicast packet from the node S. and because the node A has no child node, the node A does not need to determine whether to forward the multicast packet. The node A performs bitwise AND on the first bit string 0101 and the third bit string 0001 of the node A, that is, 0101

&0001=0001, to obtain bits that are not all zeros, and determines that the node A is a target node of the multicast packet, in other words, the target nodes of the multicast packet include the node A; and receives the multicast packet and reports the multicast packet to a CPU for processing.

Step D5: After receiving the multicast packet from the node B, the node D performs operations in a manner similar to that of the node B, determines to forward the multicast packet to all child nodes, that is, forward the multicast packet to the node F and the node Q and determines that the node D is not a target node of the multicast packet. After receiving the multicast packet from the node B, the node E performs operations in a manner similar to that of the node B, determines to forward the multicast packet to all child nodes, that is, forward the multicast packet to the node H. and determines that the node E is a target node of the multicast packet; and receives the multicast packet and reports the multicast packet to the CPU for processing.

Step D6: After receiving the multicast packet from the node D, the node F performs an operation in a manner similar to that of the node A, and determines that the node F is a target node of the multicast packet; and receives the multicast packet and reports the multicast packet to a CPU for processing. Because the node F has no child node, the node F does not need to determine whether to forward the multicast packet. After receiving the multicast packet from the node D, the node G performs an operation in a manner similar to that of the node A, and determines that the node G is not a target node of the multicast packet. Because the node G has no child node, the node G does not need to determine whether to forward the multicast packet. After receiving the multicast packet from the node E, the node H performs an operation in a manner similar to that of the node A, and determines that the node H is a target node of the multicast packet; and receives the multicast packet and reports the multicast packet to the CPU for processing. Because the node H has no child node, the node H does not need to determine whether to forward the multicast packet.

Figure 3:
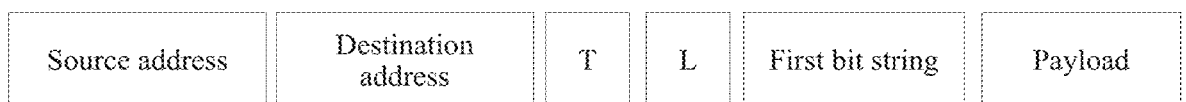
FIG. 3 is a schematic diagram of a packet format of a multicast packet according to an embodiment of the present invention.

FIG. 3 is a schematic diagram of a possible packet format of a multicast packet according to an embodiment of the present invention. A source address indicates a source media access control (Media Access Control, MAC) address of the multicast packet. A destination address indicates a destination MAC address of the multicast packet. T indicates whether the packet is a multicast packet in this embodiment of the present invention. L indicates a bit width of a first-bit-string field, and may be designed as required. A first bit string indicates a target node group of the packet. A payload indicates a payload of the packet. The possible packet format in the present invention is not limited to that shown in FIG. 3.

In the embodiments of the present invention, only the rightmost bit to a non-zero bit of each of the first bit string, the second bit string, and the third bit string may be selected, and none of the first bit string, the second bit string, and the third bit string needs to be stored or encapsulated based on a longest bit string. When a bitwise operation needs to be performed, a padding operation or a shortening operation may be performed first. A length of a bit string in the embodiments of the present invention is variable. This means that an unlimited quantity of groups may be supported, without being restricted by a fixed length of a conventional field. For example, in a conventional protocol, if a field has a fixed width of 8 bits, the field indicates a maximum of eight groups. However, there may be no upper limit to a quantity of groups in this embodiment of the present invention.

In Embodiment A, Embodiment B. Embodiment C. and Embodiment D, when a node determines that a multicast packet needs to be forwarded, the node directly forwards the multicast packet. In some embodiments, the node may modify the multicast packet and then forward a modified multicast packet, for example, may perform a bitwise AND operation on the first bit string and the second bit string, to obtain an updated first bit string, where the modified multicast packet includes the updated first bit string. In some embodiments, the node may perform a bitwise OR operation on the first bit string and the second bit string, to obtain an updated first bit string, where the modified multicast packet includes the updated first bit string.

In the foregoing embodiments, a second bit string and a third bit string are already stored in a node. For how the node obtains the second bit string and the third bit string, an example in which the one or more related nodes of the first node in the second bit string of the first node include the first node, the O child nodes, and the one or more descendant nodes of the O child nodes is used to describe in detail obtaining and update of the second bit string and the third bit string.

First Manner:

Each node in the network obtains a third bit string, which may be configured by the management platform through delivery, or may be configured manually. Each node in the network initializes a second bit string to be equal to the third bit string. A leaf node in the network sends a second bit string of the leaf node to a parent node of the leaf node. After receiving the second bit string of the child node, the parent node performs a bitwise OR operation on a second bit string of the parent node and the second bit string of the child node, to obtain an updated second bit string of the parent node. The foregoing process is repeated, and the nodes at all levels sequentially update second bit strings, until a root node updates a second bit string.

Second Manner:

Each node in the network obtains a third bit string, which may be configured by the management platform through delivery, or may be configured manually. Each node in the network obtains a second bit string, which may be configured by the management platform through delivery, or may be configured manually.

Third Manner:

Each node in the network obtains a second bit string and a third bit string. The management platform determines that currently there is a node whose second bit string needs to be updated, and sends an update message to a branch of the node, where a destination address of the update message is set to an address of a deepest-layer node along the way. A forwarding node receives the update message, determines whether a second bit string of the forwarding node needs to be updated, and determines whether the update message needs to be forwarded. All nodes along the way receive the update message and update second bit strings.

A condition for triggering a node to update a second bit string may be as follows: 1. The node sends a leaving message to notify a parent node, the node S, or the management platform; and the management platform updates a global view, where the management platform does not need to perform processing if the second bit string of each node in the network does not need to be updated, or triggers update if the second bit string of each node in the network needs to be updated, 2. The node unexpectedly leaves the network; and the management platform periodically detects the global view, and triggers an update mechanism if finding that a second bit string changes because a node leaves.

Fourth Manner:

Each node in the network obtains a second bit string and a third bit string. The management platform determines that currently there is a node whose third bit string needs to be updated, and sends an update message to a branch of the node, where a destination address of the update message is set to an address of the node whose third bit string needs to be updated. A forwarding node receives the update message, determines whether a second bit string of the forwarding node needs to be updated, and determines whether the update message needs to be forwarded. All nodes along the way receive the update message and update second bit strings. The destination node updates a second bit string and the third bit string.

A condition for triggering a node to update a third bit string may be as follows: The management platform needs to modify node groups to which some nodes belong.

When the one or more related nodes of the first node in the second bit string of the first node are in another case, for example, in the second indication method in the foregoing embodiment, the second bit string and the third bit string may be obtained and updated in manners similar to those in the foregoing description. A manner of updating the second bit string based on the third bit string needs to be changed based on different relationships between the second bit string and the third bit string.

A child node may send a second bit string of the child node to a parent node, and then the parent node may update a second bit string of the parent node based on the second bit string of the child node. A message sent by the child node to send the second bit string of the child node to the parent node may include a second-bit-string field, used to indicate the second bit string of the child node: may include an L field, used to indicate a length of the second bit string: and may further include an N field, used to indicate that the message carries the second bit string of the child node.

Figure 4A:
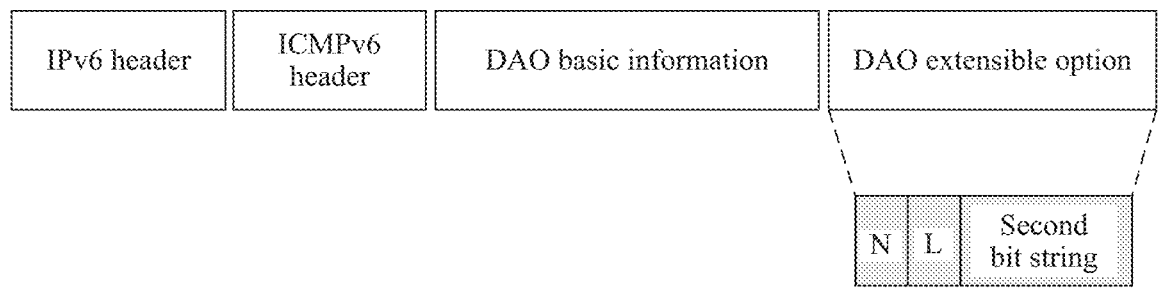
FIG. 4A shows a format of a message for reporting, by a child node, a second bit string according to an embodiment of the present invention.

FIG. 4A shows a format of a message for reporting, by a child node, a second bit string according to an embodiment of the present invention. The message is an RPL destination advertisement object (Destination Advertisement Object, DAO) message, and includes an internet protocol version 6 (Internet Protocol version 6, IPv6) header field, an internet control message protocol version 6 (Internet Control Management Protocol Version 6, ICMPv6) header field, a DAO basic information field, and a DAO extensible option field. The ICMPv6 header field includes a type field and a code field. The DAO extensible option field includes the second-bit-string field, the L field, and the N field that are provided above.

Figure 4B:
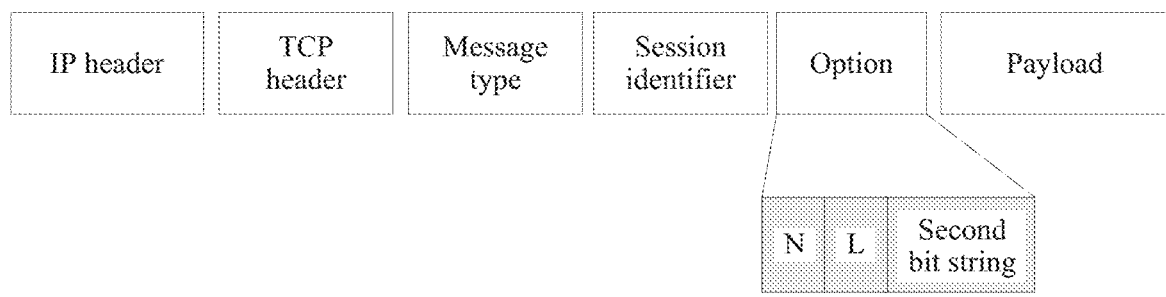
FIG. 4B shows another format of a message for reporting, by a child node, a second bit string according to an embodiment of the present invention.

FIG. 4B shows another format of a message for reporting, by a child node, a second bit string according to an embodiment of the present invention. The message is a generic autonomic signaling protocol (Generic Autonomic Signaling Protocol, GRASP) message, and includes fields such as an IP header field, a TCP header field, a message type field, a session identifier field, an option field, and a payload field. The option field includes the second-bit-string field, the L field, and the N field that are provided above.

A parent node instructs a descendant node to update a third bit string, and may also instruct a node along the way to update a second bit string. A message sent by the parent node to instruct the descendant node to update the third bit string may include a third-bit-string field, used to indicate the third bit string of the child node; may include an L1 field, used to indicate a bit width of the third-bit-string field: and may include a C field, used to indicate whether the message instructs the target node to update the third bit string. For example, C=1 indicates that the message instructs the target node to update the third bit string. If the sent message is further used to instruct the node along the way to update the second bit string, it may be considered, by default, that the node along the way updates the second bit string based on the third-bit-string field and information about the second bit string of the node, or an additional field may be used to instruct the node along the way to update the second bit string. For example, the message includes a second-bit-string field, used to indicate bit string information required by the node along the way for updating the second bit string: may include an L2 field, used to indicate a length of the second-bit-string field: may include a T field, used to indicate a computing manner in which the node along the way updates the second bit string: and may include a U field, used to indicate whether the message instructs the node to update the second bit string.

Figure 4C:
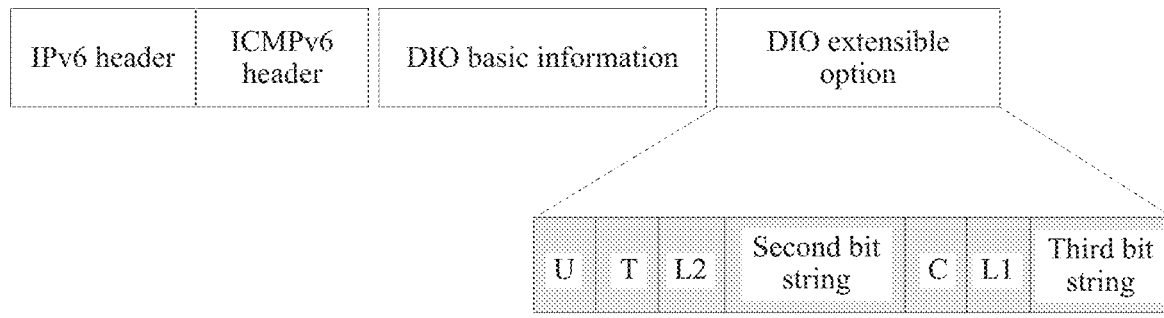
FIG. 4C shows a format of a message for instructing, by a parent node, to update a third bit string according to an embodiment of the present invention.

FIG. 4C shows a format of a message for instructing, by a parent node, to update a third bit string according to an embodiment of the present invention. The message is an RPL directed acyclic graph information object (Directed Acyclic Graph Information Object, DIO) message, and includes an IPv6 header field, an ICMPv6 header field, a DIO basic information field, and a DIO extensible option field. The ICMPv6 header field includes a type field and a code field. The DIO extensible option field includes the third-bit-string field, the L1 field, the C field, the second-bit-string field, the L2 field, the T field, and the U field that are provided above.

Figure 4D:
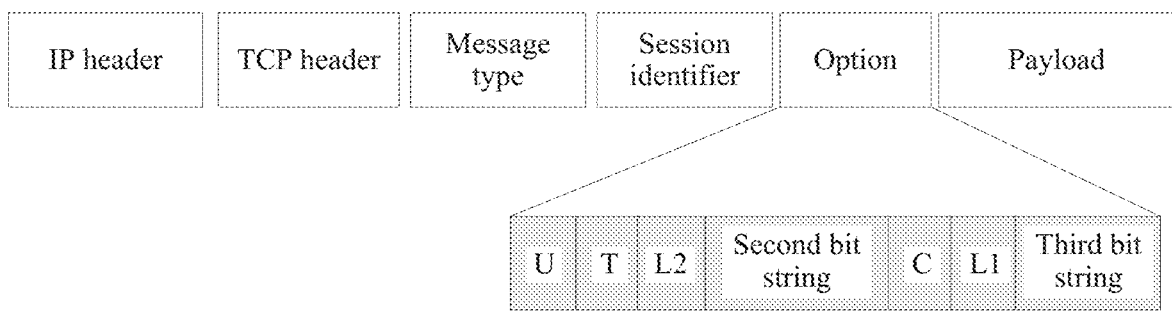
FIG. 4D shows another format of a message for instructing, by a parent node, to update a third bit string according to an embodiment of the present invention.

FIG. 4D shows another format of a message for instructing, by a parent node, to update a third bit string according to an embodiment of the present invention. The message is a generic autonomic signaling protocol (Generic Autonomic Signaling Protocol, GRASP) message, and includes fields such as an IP header field, a TCP header field, a message type field, a session identifier field, an option field, and a payload field. The option field includes the third-bit-string field, the L1 field, the C field, the second-bit-string field, the L2 field, the T field, and the U field that are provided above.

The message formats provided in FIG. 4A to FIG. 4D are merely example message formats, and the names of the fields in the message formats are merely used for distinguishing between the fields.

An embodiment of the present invention provides two computing manners for updating a second bit string. If T=0, a latest second bit string is directly placed in a second-bit-string field in a <key, value> manner, to instruct a node to update a second bit string. For example, the second-bit-string field includes <A: 111> and <C: 0110>, and the node may directly extract the updated second bit string of the node from the second-bit-string field. If T=1, a node is instructed to perform bitwise OR on an existing second bit string of the node and a third-bit-string field in a packet, to obtain an updated second bit string.

After receiving a message for instructing a descendant node to update a third bit string, for example, after receiving the message shown in FIG. 4C or FIG. 4D, the forwarding node determines that a target address is not an address of the forwarding node, and may perform the following operation: If U=0, the forwarding node may not parse a subsequent field, but directly forward the message. If U=1, it indicates that the packet carries an update message, and therefore the forwarding node further parses a T field. If T=0, it indicates that the forwarding node needs to extract a new second bit string of the forwarding node from the second-bit-string field, and therefore the forwarding node parses an L2 field and the second-bit-string field, to extract the second bit string for identifying the forwarding node. If T=1, it indicates that the forwarding node needs to perform bitwise OR on an existing second bit string of the forwarding node and the third-bit-string field in the packet, to obtain an updated second bit string.

After receiving a message for instructing a descendant node to update a third bit string, for example, after receiving the message shown in FIG. 4C or FIG. 4D, the target node determines that a target address is an address of the target node, and the target node may perform the following operation: If C=0, it indicates that the target node does not need to update a group ID of the target node. If C=1, it indicates that the target node needs to update a third bit string of the target node, and use content of the third-bit-string field as a new third bit string of the target node. A second bit string of the target node may be updated based on the operations of the forwarding node.

Figure 5:
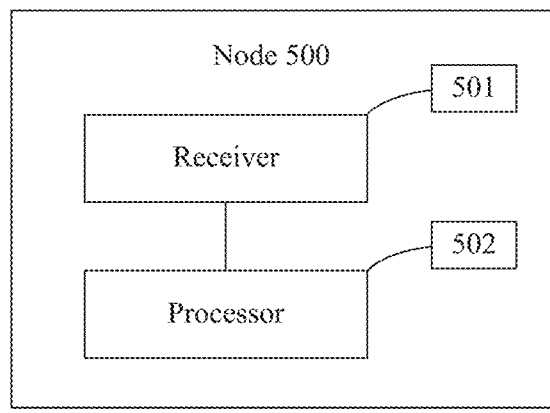
FIG. 5 is a schematic structural diagram of a node according to an embodiment of the present invention.

FIG. 5 is a schematic structural diagram of a node according to an embodiment of the present invention. The node 500 includes:

a receiver 501, configured to receive a first packet, where the first packet carries a first bit string, the first bit string includes M bit sets, each bit set corresponds to one node group, a value of the bit set is used to indicate whether one or more target nodes of the first packet include the corresponding node group, and M is an integer greater than or equal to 1; and a processor 502, configured to determine, based on the first bit string and a second bit string, whether to send the first packet to a second node, where the second bit string includes N bit sets, each bit set corresponds to one node group, a value of the bit set is used to indicate whether a node belonging to the corresponding node group exists in one or more related nodes of the first node, and N is an integer greater than or equal to 1.

In a possible design, the processor 502 is further configured to determine, based on the first bit string and a third bit string, whether the one or more target nodes of the first packet include the first node, where the third bit string includes L bit sets, each bit set corresponds to one node group, a value of the bit set is used to indicate whether the first node belongs to the corresponding node group, and L is an integer greater than or equal to 1.

In a possible design, each of the M bit sets is one bit, each of the N bit sets is one bit, and each of the L bit sets is one bit.

In a possible design, the first node includes O child nodes, the O child nodes include the second node, and O is an integer greater than or equal to 1.

In a possible design, the one or more related nodes of the first node include the first node, the O child nodes, and one or more descendant nodes of the O child nodes.

In a possible design, the receiver 501 is further configured to obtain a bit string corresponding to each of the O child nodes, where the bit string corresponding to each child node includes a plurality of bit sets, each bit set corresponds to one node group, and a value of the bit set is used to indicate whether a node belonging to the corresponding node group exists in the child node and the one or more descendant nodes of the child node; the receiver 501 is further configured to obtain a third bit string, where the third bit string includes L bit sets, each bit set corresponds to one node group, a value of the bit set is used to indicate whether the first node belongs to the corresponding node group, and L is an integer greater than or equal to 1; and the processor 502 is further configured to obtain the second bit string based on the bit string corresponding to each of the O child nodes and the third bit string.

In a possible design, each of the O child nodes corresponds to one second bit string, and the processor 502 is specifically configured to determine, based on the first bit string and a second bit string corresponding to the second node, whether to send the first packet to the second node, where the one or more related nodes of the first node include the second node and one or more descendant nodes of the second node.

In a possible design, the receiver 501 is further configured to obtain the second bit string corresponding to the second node from the second node: or the receiver 501 is further configured to obtain the second bit string corresponding to the second node from a management node.

In a possible design, the processor 502 is specifically configured to: perform a bitwise AND operation on the first bit string and the second bit string, and determine, based on an operation result, whether to send the first packet to the second node; or the processor 502 is specifically configured to: perform a bitwise OR operation on the first bit string and the second bit string, and determine, based on an operation result, whether to send the first packet to the second node.

In a possible design, the processor 502 is specifically configured to: perform the bitwise AND operation on the first bit string and the second bit string, to obtain an updated first bit string, and determine, based on the updated first bit string, whether to send the first packet to the second node; or the processor 502 is specifically configured to: perform the bitwise OR operation on the first bit string and the second bit string, to obtain an updated first bit string, and determine, based on the updated first bit string, whether to send the first packet to the second node.

In a possible design, if M is greater than N, the processor 502 is further configured to perform a padding operation on the second bit string, or the processor 502 is further configured to perform a shortening operation on the first bit string; or if M is less than N, the processor 502 is further configured to perform a padding operation on the first bit string, or the processor 502 is further configured to perform a shortening operation on the second bit string.

In a possible design, the node further includes: receiving, by the first node, a bit string update message, and determining, based on a destination address of the bit string update message, whether the first node is a destination node of the bit string update message; and if the first node is a destination node of the bit string update message, updating a third bit string of the first node based on the bit string update message; or if the first node is not a destination node of the bit string update message, updating the second bit string of the first node based on the bit string update message.

In a possible design, the L bit sets of the third bit string include a first bit set and a second bit set, the first bit set indicates that the first node belongs to a first node group, and the second bit set indicates that the first node belongs to a second node group.

Figure 6:
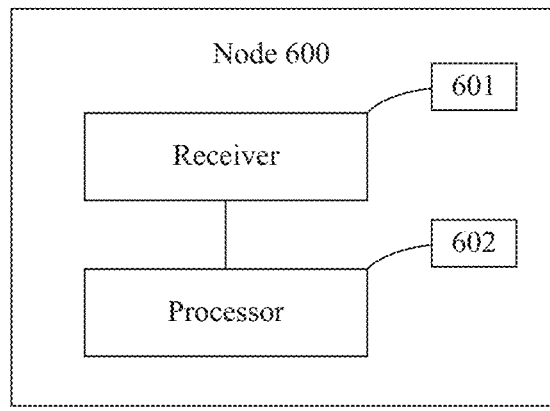
FIG. 6 is a schematic structural diagram of another node according to an embodiment of the present invention.

FIG. 6 is a schematic structural diagram of another node according to an embodiment of the present invention. The node 600 includes:

a receiver 601, configured to receive a first packet, where the first packet carries a first bit string, the first bit string includes M bit sets, each bit set corresponds to one node group, a value of the bit set is used to indicate whether one or more target nodes of the first packet include the corresponding node group, and M is an integer greater than or equal to 1; and a processor 602, configured to determine, based on the first bit string and a third bit string, whether the one or more target nodes of the first packet include the first node, where the third bit string includes L bit sets, each bit set corresponds to one node group, a value of the bit set is used to indicate whether the first node belongs to the corresponding node group, and L is an integer greater than or equal to 1.

In a possible design, the processor 602 is further configured to determine, based on the first bit string and a second bit string, whether to send the first packet to a second node, where the second bit string includes N bit sets, each bit set corresponds to one node group, a value of the bit set is used to indicate whether a node belonging to the corresponding node group exists in one or more related nodes of the first node, and N is an integer greater than or equal to 1.

In a possible design, each of the M bit sets is one bit, each of the N bit sets is one bit, and each of the L bit sets is one bit.

In a possible design, the first node includes O child nodes, the O child nodes include the second node, and O is an integer greater than or equal to 1.

In a possible design, the one or more related nodes of the first node include the first node, the O child nodes, and one or more descendant nodes of the O child nodes.

In a possible design, the receiver 601 is further configured to obtain a bit string corresponding to each of the O child nodes, where the bit string corresponding to each child node includes a plurality of bit sets, each bit set corresponds to one node group, and a value of the bit set is used to indicate whether a node belonging to the corresponding node group exists in the child node and the one or more descendant nodes of the child node; the receiver 601 is further configured to obtain a third bit string, where the third bit string includes L bit sets, each bit set corresponds to one node group, a value of the bit set is used to indicate whether the first node belongs to the corresponding node group, and L is an integer greater than or equal to 1; and the processor 602 is further configured to obtain the second bit string based on the bit string corresponding to each of the O child nodes and the third bit string.

In a possible design, each of the O child nodes corresponds to one second bit string, and the processor 602 is specifically configured to determine, based on the first bit string and a second bit string corresponding to the second node, whether to send the first packet to the second node, where the one or more related nodes of the first node include the second node and one or more descendant nodes of the second node.

In a possible design, the receiver 601 is further configured to obtain the second bit string corresponding to the second node from the second node; or the receiver 601 is further configured to obtain the second bit string corresponding to the second node from a management node.

In a possible design, the processor 602 is specifically configured to: perform a bitwise AND operation on the first bit string and the second bit string, and determine, based on an operation result, whether to send the first packet to the second node; or the processor 602 is specifically configured to: perform a bitwise OR operation on the first bit string and the second bit string, and determine, based on an operation result, whether to send the first packet to the second node.

In a possible design, the processor 602 is specifically configured to: perform the bitwise AND operation on the first bit string and the second bit string, to obtain an updated first bit string, and determine, based on the updated first bit string, whether to send the first packet to the second node; or the processor 602 is specifically configured to: perform the bitwise OR operation on the first bit string and the second bit string, to obtain an updated first bit string, and determine, based on the updated first bit string, whether to send the first packet to the second node.

In a possible design, if M is greater than N, the processor 602 is further configured to perform a padding operation on the second bit string, or the processor 602 is further configured to perform a shortening operation on the first bit string; or if M is less than N, the processor 602 is further configured to perform a padding operation on the first bit string, or the processor 602 is further configured to perform a shortening operation on the second bit string.

In a possible design, the node further includes: receiving, by the first node, a bit string update message, and determining, based on a destination address of the bit string update message, whether the first node is a destination node of the bit string update message; and if the first node is a destination node of the bit string update message, updating a third bit string of the first node based on the bit string update message; or if the first node is not a destination node of the bit string update message, updating the second bit string of the first node based on the bit string update message.

In a possible design, the L bit sets of the third bit string include a first bit set and a second bit set, the first bit set indicates that the first node belongs to a first node group, and the second bit set indicates that the first node belongs to a second node group.

The foregoing node is configured to perform the foregoing method embodiments, and an implementation principle and technical effects of the node are similar to those of the method embodiments. Details are not described herein again.

It should be noted that, division of the modules of the foregoing device is merely logical function division, and in actual implementation, the modules may be all or partially integrated into one physical entity, or may be physically separated. In addition, all of these modules may be implemented in a form of software invoked by using a processing element, or may be implemented in a form of hardware; or some of the modules may be implemented in a form of software invoked by using a processing element, and some of the modules are implemented in a form of hardware. For example, a sending module may be an independently disposed element, or may be integrated into a chip of the foregoing device for implementation. In addition, the sending module may be stored in a memory of the foregoing device in a form of program code, and invoked by using a processing element of the foregoing device, to perform a function of the foregoing determining module. Implementations of the other modules are similar thereto. In addition, these modules may be all or partially integrated together, or may be implemented independently. The processing element herein may be an integrated circuit and has a signal processing capability. In an implementation process, the steps in the foregoing method or the foregoing modules can be implemented by using a hardware integrated logical circuit in the processor element, or by using instructions in a form of software.

For example, the foregoing modules may be configured as one or more integrated circuits for implementing the foregoing method, for example, one or more application-specific integrated circuits (Application Specific Integrated Circuit. ASIC), or one or more microprocessors (Digital Signal Processor, DSP), or one or more field programmable gate arrays (Field Programmable Gate Array. FPGA). For another example, when a module above is implemented by invoking program code by using a processing element, the processing element may be a general-purpose processor, for example, a central processing unit (Central Processing Unit, CPU) or another processor that can invoke program code. For another example, these modules may be integrated together, and implemented in a form of a system-on-a-chip (system-on-a-chip, SOC).

It should be understood that, "first", "second", "third", "fourth", and various numbers in this specification are merely used for distinguishing for ease of description, and are not intended to limit the scope of the embodiments of the present invention.

Figure 7:
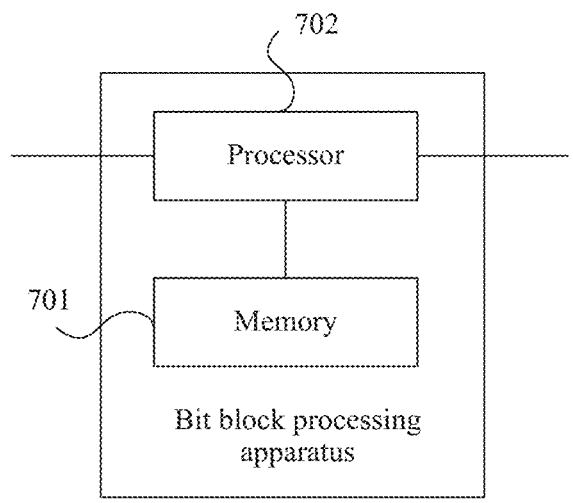
FIG. 7 is a schematic structural diagram of still another node according to an embodiment of the present invention.

FIG. 7 is a schematic structural diagram of still another node according to an embodiment of the present invention. The apparatus may be the node S, the node A, the node B, the node D, the node E, the node F, the node G. or the node H in FIG. 1. As shown in FIG. 7, the apparatus includes a memory 701 and a processor 702.

The memory 701 may be an independent physical unit, and may be connected to the processor 702 by using a bus. Alternatively, the memory 701 and the processor 702 may be integrated together, and implemented by using hardware, or the like.

The memory 701 is configured to store a program for implementing the foregoing method embodiments, and the processor 702 invokes the program, to perform the operations in the foregoing method embodiments.

Optionally, when a service data transmission method in the foregoing embodiments is all or partially implemented by using software, the apparatus may alternatively include only the processor. The memory configured to store the program is located outside an access device. The processor is connected to the memory through a circuit/wire, and is configured to read and execute the program stored in the memory.

The processor may be a central processing unit (Central Processing Unit, CPU), a network processor (Network Processor, NP), or a combination of a CPU and an NP.

The processor may further include a hardware chip. The hardware chip may be an application-specific integrated circuit (Application-specific Integrated Circuit, ASIC), a programmable logic device (Programmable Logic Device, PLD), or a combination thereof. The PLD may be a complex programmable logic device (Complex Programmable Logic Device, CPLD), a field programmable gate array (Field-programmable Gate Array, FPGA), generic array logic (Generic Array Logic, GAL), or any combination thereof.

The memory may include a volatile memory (volatile memory), for example, a random-access memory (Random-Access Memory, RAM); or the memory may include a nonvolatile memory (non-volatile memory), for example, a flash memory (flash memory), a hard disk (Hard Disk Drive, HDD), or a solid-state drive (Solid-State Drive, SSD); or the memory may include a combination of the foregoing types of memories.

An embodiment of the present invention further provides a computer storage medium, storing a computer program, and the computer program is used to perform a service data transmission method provided in the foregoing embodiments.

An embodiment of the present invention further provides a computer program product including an instruction, and when the computer program product runs on a computer, the computer is enabled to perform a service data transmission method provided in the foregoing embodiments.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A packet processing method, wherein the method comprises:
   receiving, by a first node, a first packet, wherein the first packet carries a first bit string, the first bit string comprises M bit sets, each bit set corresponds to one node group, a value of the bit set indicates whether one or more target nodes of the first packet comprise the corresponding node group, and M is an integer greater than or equal to 1; and
   determining, by the first node based on the first bit string and a second bit string, whether to send the first packet to a second node, wherein the second bit string comprises N bit sets, each bit set corresponds to one node group, a value of the bit set indicates whether a node belonging to the corresponding node group exists in one or more related nodes of the first node, and N is an integer greater than or equal to 1.

2. The method according to claim 1, wherein the method further comprises:
   determining, by the first node based on the first bit string and a third bit string, whether the one or more target nodes of the first packet comprise the first node, wherein the third bit string comprises L bit sets, each bit set corresponds to one node group, a value of the bit set indicates whether the first node belongs to the corresponding node group, and L is an integer greater than or equal to 1.

3. The method according to claim 2, wherein each of the M bit sets is one bit, each of the N bit sets is one bit, and each of the L bit sets is one bit.

4. The method according to claim 1, wherein the first node comprises O child nodes, the O child nodes comprise the second node, and O is an integer greater than or equal to 1.

5. The method according to claim 4, wherein the one or more related nodes of the first node comprise the first node, the O child nodes, and one or more descendant nodes of the O child nodes.

6. The method according to claim 5, wherein before the determining, by the first node based on the first bit string and a second bit string, whether to send the first packet to a second node, the method further comprises:
   obtaining a bit string corresponding to each of the O child nodes, wherein the bit string corresponding to each child node comprises a plurality of bit sets, each bit set corresponds to one node group, and a value of the bit set indicates whether a node belonging to the corresponding node group exists in the child node and the one or more descendant nodes of the child node;
   obtaining a third bit string, wherein the third bit string comprises L bit sets, each bit set corresponds to one node group, a value of the bit set indicates whether the first node belongs to the corresponding node group, and L is an integer greater than or equal to 1; and
   obtaining the second bit string based on the bit string corresponding to each of the O child nodes and the third bit string.

7. The method according to claim 1, wherein the determining, by the first node based on the first bit string and a second bit string, whether to send the first packet to a second node comprises:
   performing a bitwise AND operation on the first bit string and the second bit string, and determining, based on an operation result, whether to send the first packet to the second node; or
   performing a bitwise OR operation on the first bit string and the second bit string, and determining, based on an operation result, whether to send the first packet to the second node.

8. The method according to claim 7, wherein the performing a bitwise AND operation on the first bit string and the second bit string, and determining, based on an operation result, whether to send the first packet to the second node comprises:
   performing the bitwise AND operation on the first bit string and the second bit string, to obtain an updated first bit string, and determining, based on the updated first bit string, whether to send the first packet to the second node; and
   the performing a bitwise OR operation on the first bit string and the second bit string, and determining, based on an operation result, whether to send the first packet to the second node comprises:
   performing the bitwise OR operation on the first bit string and the second bit string, to obtain an updated first bit string, and determining, based on the updated first bit string, whether to send the first packet to the second node.

9. The method according to claim 7, wherein a value of M is not equal to a value of N, and before the performing a bitwise AND operation on the first bit string and the second bit string or performing a bitwise OR operation on the first bit string and the second bit string, the method further comprises:
   if M is greater than N, performing a padding operation on the second bit string, or performing a shortening operation on the first bit string; or
   if M is less than N, performing a padding operation on the first bit string, or performing a shortening operation on the second bit string.

10. A packet processing method, wherein the method comprises:
    receiving, by a first node, a first packet, wherein the first packet carries a first bit string, the first bit string comprises M bit sets, each bit set corresponds to one node group, a value of the bit set indicates whether one or more target nodes of the first packet comprise the corresponding node group, and M is an integer greater than or equal to 1; and
    determining, by the first node based on the first bit string and a third bit string, whether the one or more target nodes of the first packet comprise the first node, wherein the third bit string comprises L bit sets, each bit set corresponds to one node group, a value of the bit set indicates whether the first node belongs to the corresponding node group, and L is an integer greater than or equal to 1.

11. The method according to claim 10, wherein the method further comprises:
    determining, by the first node based on the first bit string and a second bit string, whether to send the first packet to a second node, wherein the second bit string comprises N bit sets, each bit set corresponds to one node group, a value of the bit set indicates whether a node belonging to the corresponding node group exists in one or more related nodes of the first node, and N is an integer greater than or equal to 1.

12. A first node, wherein the first node comprises:
    a receiver, configured to receive a first packet, wherein the first packet carries a first bit string, the first bit string comprises M bit sets, each bit set corresponds to one node group, a value of the bit set indicates whether one or more target nodes of the first packet comprise the corresponding node group, and M is an integer greater than or equal to 1; and
    a processor, configured to determine, based on the first bit string and a second bit string, whether to send the first packet to a second node, wherein the second bit string comprises N bit sets, each bit set corresponds to one node group, a value of the bit set indicates whether a node belonging to the corresponding node group exists in one or more related nodes of the first node, and N is an integer greater than or equal to 1.

13. The first node according to claim 12, wherein the processor is further configured to determine, based on the first bit string and a third bit string, whether the one or more target nodes of the first packet comprise the first node, wherein the third bit string comprises L bit sets, each bit set corresponds to one node group, a value of the bit set indicates whether the first node belongs to the corresponding node group, and L is an integer greater than or equal to 1.

14. The first node according to claim 13, wherein each of the M bit sets is one bit, each of the N bit sets is one bit, and each of the L bit sets is one bit.

15. The first node according to claim 13, wherein
    the processor is configured to: perform a bitwise AND operation on the first bit string and the second bit string, and determine, based on an operation result, whether to send the first packet to the second node; or the processor is configured to: perform a bitwise OR operation on the first bit string and the second bit string, and determine, based on an operation result, whether to send the first packet to the second node.

16. The first node according to claim 15, wherein the processor is configured to: perform the bitwise AND operation on the first bit string and the second bit string, to obtain an updated first bit string, and determine, based on the updated first bit string, whether to send the first packet to the second node; or the processor is configured to: perform the bitwise OR operation on the first bit string and the second bit string, to obtain an updated first bit string, and determine, based on the updated first bit string, whether to send the first packet to the second node.

17. The first node according to claim 15, wherein if M is greater than N, the processor is further configured to perform a padding operation on the second bit string, or the processor is further configured to perform a shortening operation on the first bit string; or if M is less than N, the processor is further configured to perform a padding operation on the first bit string, or the processor is further configured to perform a shortening operation on the second bit string.

18. The first node according to claim 12, wherein the first node comprises O child nodes, the O child nodes comprise the second node, and O is an integer greater than or equal to 1.

19. The first node according to claim 18, wherein the one or more related nodes of the first node comprise the first node, the O child nodes, and one or more descendant nodes of the O child nodes.

20. The first node according to claim 19, wherein the receiver is further configured to obtain a bit string corresponding to each of the O child nodes, wherein the bit string corresponding to each child node comprises a plurality of bit sets, each bit set corresponds to one node group, and a value of the bit set indicates whether a node belonging to the corresponding node group exists in the child node and the one or more descendant nodes of the child node;

the receiver is further configured to obtain a third bit string, wherein the third bit string comprises L bit sets, each bit set corresponds to one node group, a value of the bit set indicates whether the first node belongs to the corresponding node group, and L is an integer greater than or equal to 1; and the processor is further configured to obtain the second bit string based on the bit string corresponding to each of the O child nodes and the third bit string.

* * * * *